United States Patent [19]
Blee

[11] Patent Number: 5,379,856
[45] Date of Patent: Jan. 10, 1995

[54] RACK AND PINION STEERING GEAR ASSEMBLY

[75] Inventor: Timothy J. Blee, Troy, Mich.

[73] Assignee: TRW Inc., Lyndhurst, Ohio

[21] Appl. No.: 135,020

[22] Filed: Oct. 12, 1993

[51] Int. Cl.$^6$ .......................... B62D 5/22; F16J 15/50
[52] U.S. Cl. ...................................... 180/148; 74/18.2
[58] Field of Search ................ 180/132, 148, 79, 145, 180/162; 74/18, 18.1, 18.2

[56] References Cited

U.S. PATENT DOCUMENTS

| | | | |
|---|---|---|---|
| 2,960,372 | 11/1960 | Wasley | 384/477 |
| 3,700,297 | 10/1972 | Fickenwirth et al. | 384/477 |
| 4,002,079 | 1/1977 | Hall | 74/18.2 |
| 4,584,893 | 4/1986 | Harding et al. | 74/422 |

*Primary Examiner*—Eric D. Culbreth
*Assistant Examiner*—Kevin Hurley
*Attorney, Agent, or Firm*—Tarolli, Sundheim & Covell

[57] ABSTRACT

A rack and pinion steering gear assembly 10 includes a rack 14 which is movable relative to a housing 12 to turn steerable vehicle wheels. The rack 14 extends through a bellows 34 which is connected with an end portion of the rack 14 and an end portion of a housing 12. A deformable and compressible body 40 of foam material is located in the bellows 34. The deformable and compressible body 40 of foam material includes a body 70 of closed-cell foam 10 material and/or a body 66 of open-cell foam material. The body 70 of closed-cell foam material retards conduction to the rack 14 of any water which may leak through the bellows 34. The body 66 of open-cell foam material contains lubricating liquid which is applied to the rack 14. If desired, the bellows 34 and deformable and compressible body 40 of foam material may be used in an apparatus other than a rack and pinion steering gear assembly.

21 Claims, 4 Drawing Sheets

RACK AND PINION STEERING GEAR ASSEMBLY

BACKGROUND OF THE INVENTION

The present invention relates to a shield, seal and lubricating mechanism for a member which moves relative to a housing. More specifically, the present invention relates to a rack and pinion steering gear assembly for use in turning a steerable vehicle wheel.

Known rack and pinion steering gear assemblies which are manually actuated are disclosed in U.S. Pat. Nos. 3,693,999 and 3,820,415. Known rack and pinion steering gear assemblies which are power assisted are disclosed in U.S. Pat, Nos. 3,709,099; 4,415 054 and 4,819,499. Many known rack and pinion steering gear assemblies have been provided with a bellows or boot seal between an end portion of the rack and a housing in the manner similar to the disclosures in U.S. Pat. Nos. 3,762,740 and 3,927,576.

If the bellows which seals a rack and pinion steering gear is damaged during operation of the vehicle, water and other contaminants may leak into the bellows. If this occurs, the water may cause the rack to rust. Also, the bellows helps to keep dirt and other contaminants off a portion of the rack bar that passes through a bearing or hydraulic seal and hence aids in protecting the rack, bearing and seal from damage.

SUMMARY OF THE INVENTION

An improved apparatus includes a member which is movable relative to a housing. The apparatus includes a bellows which is connected to the member and to the housing.

A deformable and compressible body of foam material is located in a chamber in the bellows. Preferably, the deformable and compressible body of foam material has a volume which changes as the member moves. The deformable and compressible body of foam material may include a body of closed-cell foam material and/or a body of open-cell foam material. The body of closed-cell foam material retards conduction to the member of any water which may leak through an outer surface or skin of the bellows. The body of open-cell foam material may contain lubricating liquid which is applied to the member during relative movement therebetween.

It is contemplated that the apparatus may be a rack and pinion steering gear assembly. When the apparatus is a rack and pinion gear assembly, the movable member is the rack.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF SPECIFIC PREFERRED EMBODIMENTS OF THE INVENTION

General Description

Figure 1:
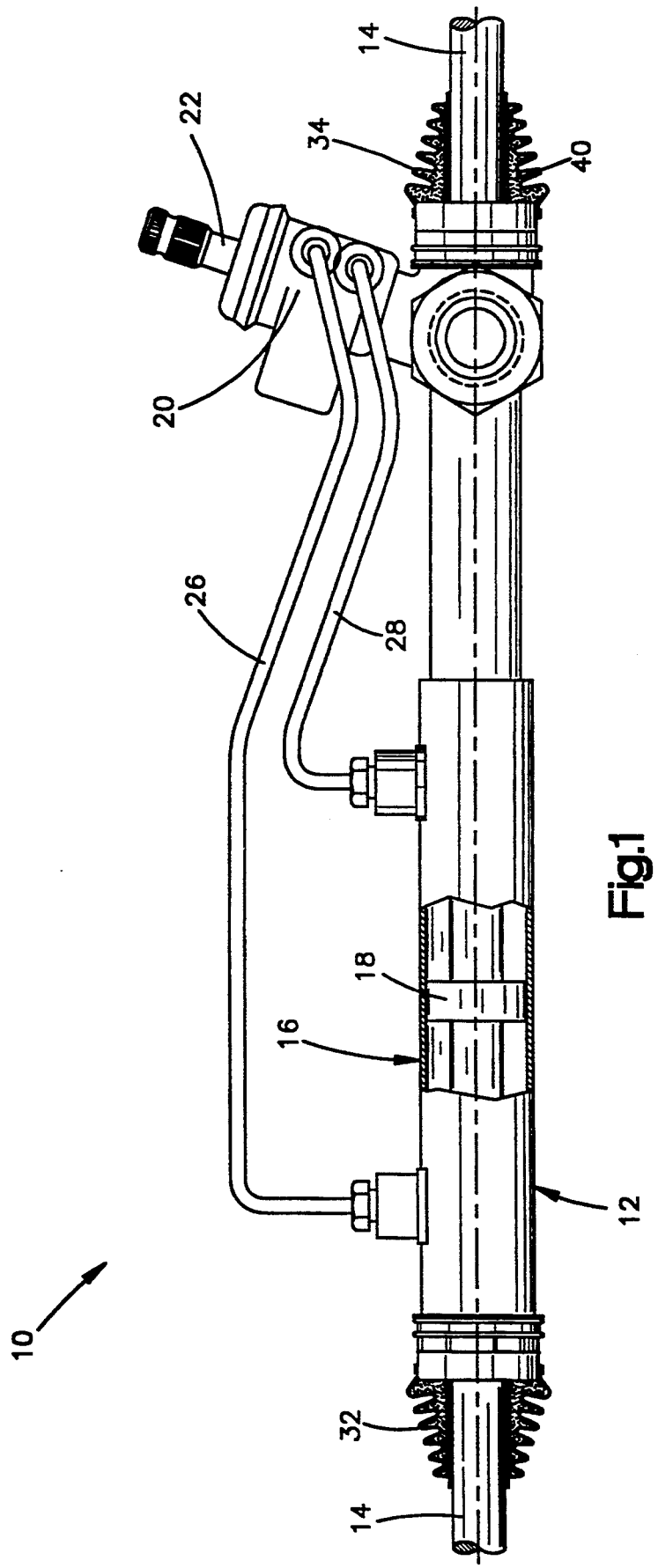
FIG. 1 is a schematic illustration of a rack and pinion steering gear assembly.

An apparatus 10 constructed in accordance with the present invention is illustrated in FIG. 1. In the illustrated embodiment of the invention, the apparatus 10 is a rack and pinion steering gear assembly. The rack and pinion steering gear assembly 10 includes a housing 12. A rack 14 is supported by and is movable relative to the housing 12. The rack 14 is connected with steerable vehicle wheels (not shown) by suitable linkage. Upon movement of the rack 14 relative to the housing 12, the steerable vehicle wheels are turned in a known manner.

In the illustrated embodiment of the invention, a hydraulic motor 16 is provided to assist the operator in turning the steerable vehicle wheels. The hydraulic motor 16 includes a piston 18 which is fixedly connected to the rack 14. A power steering control valve 20 has an input shaft 22 which is connected with a steering wheel of a vehicle. Upon rotation of the input shaft 22 by the steering wheel of the vehicle, the power steering control valve 20 ports fluid under pressure to the power steering motor 16 through one of a pair of conduits 26 or 28 and connects the motor with a reservoir through the other conduit. The fluid pressure causes the hydraulic motor 16 to move the rack 14.

The power steering valve 20 is mechanically connected with the rack 14 by a pinion (not shown). The pinion is disposed in meshing engagement with teeth on the rack 14. Operation of the hydraulic motor 16 moves the rack 14 and drives the pinion in a follow-up manner to return the power steering valve 20 to a neutral condition when the steerable vehicle wheels have been turned to an extent corresponding to rotation of the steering wheel and input shaft 22.

Although the rack and pinion steering gear assembly 10 is assisted by a hydraulic motor, it is contemplated that movement of the rack 14 could be assisted with other types of motors, for example, an electric motor. It is also contemplated that the rack and pinion steering gear assembly 10 could be of the manually actuated type which does not utilize power assistance.

A pair of bellows 32 and 34 are connected with opposite end portions of the housing 12 and the rack 14. The bellows 32 is connected with the left (as viewed in FIG. 1) end portion of the housing 12 and the left end portion of the rack 14. Similarly, the bellows 34 is connected with the right (as viewed in FIG. 1) end portion of the housing 12 and the right end portion of the rack 14. The bellows 32 and 34 have a known physical configuration and construction similar to the construction disclosed in U.S. Pat. Nos. 3,762,740 and 3,927,576.

In accordance with a feature of the present invention, a deformable and compressible body 40 (FIG. 2) constructed of a polymeric foam material is disposed in a chamber 42 in the bellows 34. The deformable and compressible body 40 has a generally tubular configuration and has a cylindrical inner side surface 46 through which the rack 14 extends. An end portion 50 of the bellows 34 is connected with the rack 14 by an annular band 52. Similarly, an opposite end portion 54 of the bellows 34 is connected with the housing 12 by an annular band 56. A suitable adhesive 58 interconnects an inner side surface of the bellows 34 and a corrugated outer side surface 62 of the deformable and compressible body 40 of material.

In accordance with one of the features of the present invention, the deformable and compressible body 40 of foam material includes a body 66 (FIG. 2) of liquid permeable material. The body 66 of liquid permeable material has a tubular cylindrical configuration. The inner side surface 46 of the deformable and compressible body 40 of foam material is disposed on the body 66 of liquid permeable foam material. The body 66 of liquid permeable foam material contains a lubricating liquid (oil) which is 10 applied to a cylindrical outer side surface 68 of the rack 14 by the body 66 of liquid permeable foam material. The lubricating liquid may contain a rust inhibitor.

The body 66 of liquid permeable foam material has an open-cell construction. Thus, in the illustrated embodiment of the invention, the body 66 of liquid permeable foam material is an open-cell foam in which the individual cells are interconnected or intercommunicating in a manner similar to a natural sponge. Therefore, there is fluid communication between the cells formed in the body 66 of liquid permeable foam material. The open cells of the body 66 of liquid permeable foam material are filled with lubricating liquid (oil).

In accordance with another feature of the invention, the deformable and compressible body 40 includes a body 70 of liquid impermeable foam material. The body 70 of liquid impermeable foam material has a tubular construction and extends around the body 66 of liquid permeable foam material. The outer side surface 62 of the deformable and compressible body 40 of foam material is disposed on the body 70 of liquid impermeable foam material and is connected with the bellows 34.

The body 70 of liquid impermeable material extends around a portion of the rack 14 and blocks the conduction to the rack of any water which may leak through the bellows 34. Thus, if for some unforeseen reason the bellows 34 should be damaged in such a manner as to enable water and/or other liquid contaminants to leak through the outer surface of the bellows, the body 70 of liquid impermeable material would nonetheless block the conduction of the liquid to the rack 14.

The body 70 of liquid impermeable material has a closed-cell construction. Thus, in the illustrated embodiment of the invention, the body 70 of liquid impermeable material is a closed-cell foam in which individual cells are completely surrounded by a thin membrane of water impermeable material. Thus, liquids, such as water, can not be conducted between adjacent cells of the body 70 of liquid impermeable material.

The body 70 of liquid impermeable material has a cylindrical inner side surface 74 which is bonded or otherwise secured to an outer side surface 76 of the body 66 of liquid permeable foam material. The body 66 of liquid permeable foam material and the body 70 of liquid impermeable material are connected with each other and with the bellows 34. Upon compression of the bellows 34, both the body 66 of liquid permeable foam material and the body 70 of liquid impermeable material are compressed. Similarly, upon expansion of the bellows 34, both the body 66 of liquid permeable foam material and the body 70 of liquid impermeable material are expanded.

The body 66 of liquid permeable foam material and the body 70 of liquid impermeable material both have a very high degree of compressibility. This enables the 10 deformable and compressible body 40 of foam material to be easily compressed from the initial configuration shown in FIG. 2 or expanded from the initial configuration of FIG. 2.

In the illustrated embodiment of the invention, the body 66 of liquid permeable foam material and the body 70 of liquid impermeable material are plastic foams. It is contemplated that the bodies 66 and 70 may be very flexible polyurethane foams. However, the composition and the makeup of the body 66 of liquid permeable foam material and the body 70 of liquid impermeable material may be substantially different.

For example, it is contemplated that the body 66 of liquid permeable foam material may be a urethane sponge which is an open-cell high density foam having a high degree of abrasion resistance. However, it should be understood that the body 66 of liquid permeable foam material and the body 70 of liquid impermeable material may be derived from natural products or from other synthetic products. Although the deformable and compressible body 40 could be formed of materials other than a foam, it is believed that it may be preferred to form the deformable and compressible body of flexible foam having a high degree of compressibility and deformability.

Operation

When the steering wheel of a vehicle is rotated to effect operation of the rack and pinion steering gear assembly 10 to turn steerable vehicle wheels, the rack 14 is moved relative to the housing 12. For example, the rack 14 may be moved axially toward the left from the initial position shown in FIG. 2 to an actuated position shown in FIG. 3. As this occurs, the bellows 34 is flexed and the volume of the chamber 42 decreases from the relatively large volume shown in FIG. 2 to the somewhat smaller volume shown in FIG. 3.

As the volume of the chamber 42 decreases, the deformable and compressible body 40 of foam material is compressed and deformed and its volume decreases. Compressing the open-celled body 66 of liquid permeable foam material forces at least a small portion of the lubricating liquid (oil) in the body 66 of open-celled liquid permeable foam material to flow out of the body of liquid permeable foam material toward the exterior surface of the rack 14. This results in wetting the rack surface with a film of lubricating liquid, which may contain a rust-inhibiting agent, being applied to the cylindrical outer side surface 68 of the rack 14. This wetted lubricating surface passes through the rack bearings and seals with greater facility and lower friction thereby reducing wear and promoting longer life of both bearings and seals.

Conversely, if oil leaks from within the rack and pinion housing through the bearings and seals, the open celled foam material will tend to wipe excess oil from the rack and absorb such excess into the body 40 thus reducing the tendency of the steering gear to leak oil onto the road or other ground surfaces.

Figure 2:
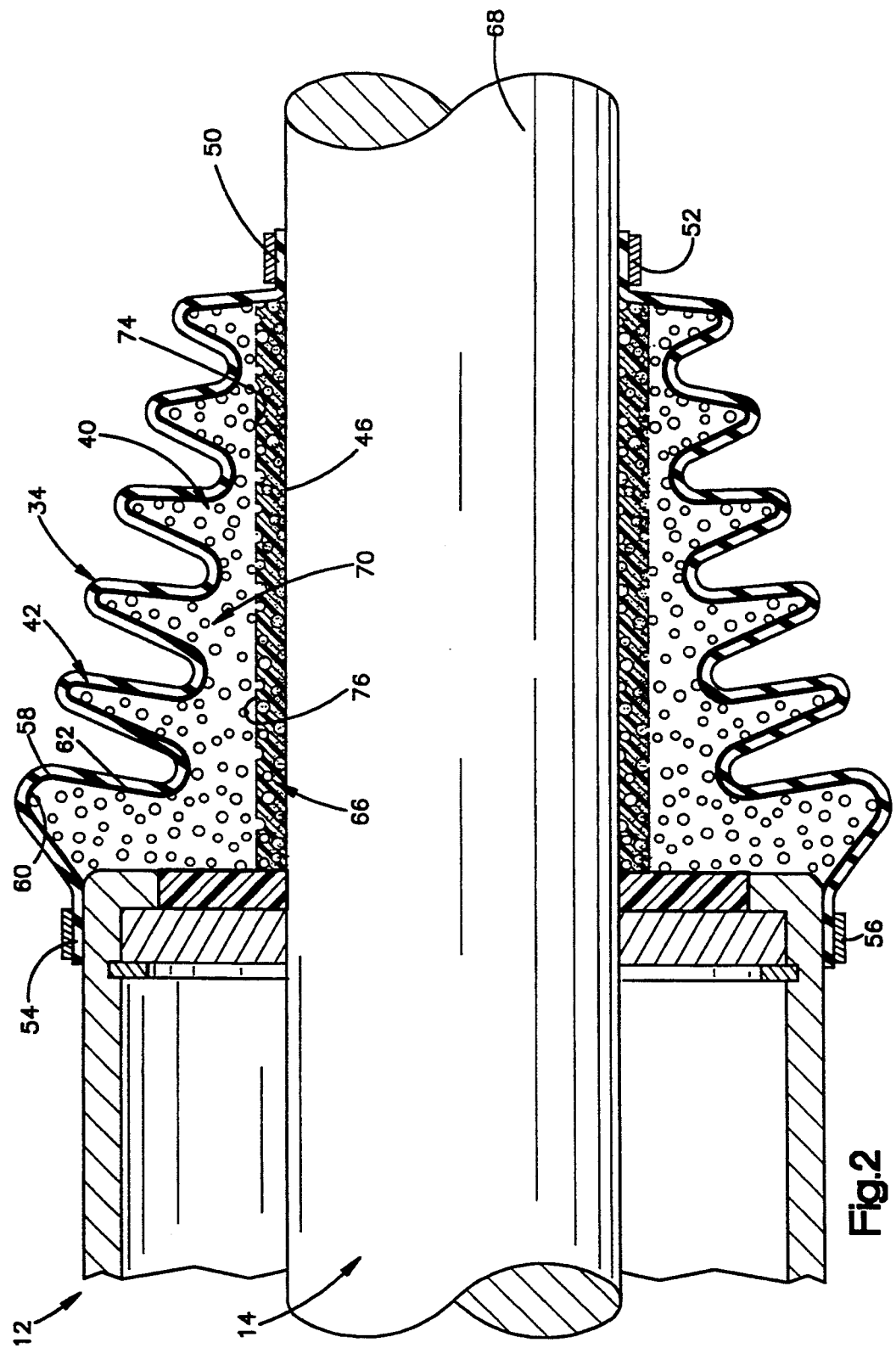
FIG. 2 is an enlarged schematic sectional view illustrating the manner in which a bellows is connected with an end portion of a rack and an end portion of a housing which supports the rack, the bellows being shown in an extended condition.
Figure 3:
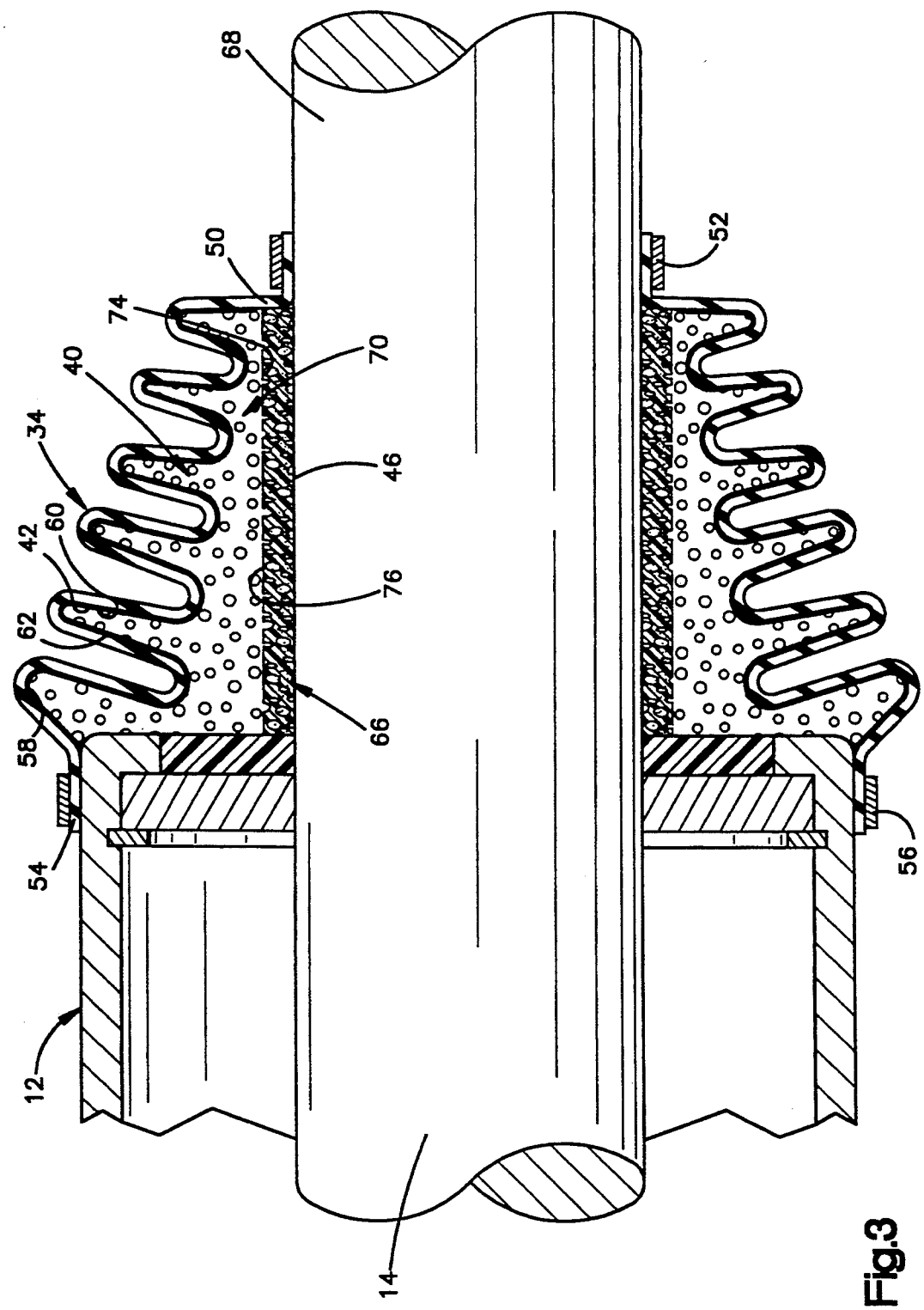
FIG. 3 is a view similar to FIG. 2, illustrating the bellows in a retracted condition.

Subsequent movement of the rack 14 from the actuated position of FIG. 3 back to the initial position of FIG. 2 expands the bellows 34 and increases the volume of the chamber 42. As the volume of the chamber 42 increases, the volume of the deformable and compressible body 40 of foam material increases. As the volume of the deformable and compressible body 40 of foam material increases, the body 66 of liquid permeable foam material expands. As this occurs, any excess lubricating liquid disposed between the rack 14 and the inner side surface 46 of the body 66 of liquid permeable foam material is drawn back into the cells of the body of liquid permeable foam material as the cells expand.

During operation of the vehicle in which the rack and pinion steering gear assembly 10 is disposed, road hazards may result in damage to the bellows 34. This damage may rupture or tear the outer, exposed surface of the bellows. When this occurs, water and/or other liquid contaminants may tend to leak into the chamber 42. However, the body 70 of liquid impermeable material will block conduction of the water inwardly toward the body 66 of liquid permeable foam material and the rack 14. Since the rack 14 is not exposed to the water, there will be no tendency for the rack to rust. Even if a small amount of water should, somehow, be conducted inwardly to the surface 68 of the rack, the coating of lubricating liquid applied to the surface 68 of the rack 14 by the body 66 of liquid permeable foam material will help prevent the formation of rust.

When the rack 14 is moved in the opposite direction, that is toward the right from the initial position shown in FIG. 2, the bellows 34 is expanded. As this occurs, the volume of the chamber 42 increases. As the volume of the chamber 42 increases, the volume of the deformable and compressible body 40 of foam material increases. Of course, when the rack 14 is moved back to the initial position of FIG. 2, the bellows 34 is returned to its initial condition and the volume of the chamber 42 is decreased to the volume shown in FIG. 2. As this occurs, the volume of the deformable and compressible body 40 of foam material decreases.

One end of the deformable and compressible body 40 of foam material is connected with the housing 12 by the bellows 34 and band 56. The opposite end of the deformable and compressible body 40 is connected with the rack 14 by the bellows 34 and band 52. Therefore, when the rack 14 moves relative to the housing 12, the end of the deformable and compressible body 40 connected with the rack 14 moves relative to the end of the deformable and compressible body of foam material connected with the housing. This results in the deformable and compressible body 40 of foam material being resiliently compressed and expanded during movement of the rack 14 relative to the housing 12 to decrease and increase the size of the chamber 42.

Although only the construction of the bellows 34 and the deformable and compressible body 40 of foam material is shown in FIGS. 2 and 3, it should be understood that the bellows 32 has the same construction as the bellows 34. It should also be understood that a deformable and compressible body of foam material having the same construction as the deformable and compressible body 40 of foam material is disposed in the bellows 32. Of course, when the rack 14 is moved toward the left from the initial condition of FIG. 2 to the actuated condition of FIG. 3 and the bellows 34 is retracted, the bellows 32 is extended. Similarly, when the rack 14 is moved toward the right from the initial condition of FIG. 2, the bellows 32 is contracted as the bellows 34 is extended.

Second Embodiment

In the embodiment of the invention illustrated in FIGS. 1-3, the deformable and compressible body 40 of foam material includes a body 70 of liquid impermeable material and a body 66 of liquid permeable foam material. In the embodiment of the invention illustrated in FIG. 4, the bellows is filled with a deformable and compressible body of foam material which is of uniform composition and is liquid impermeable. Since the embodiment of the invention illustrated in FIG. 4 is generally similar to the embodiment of the invention illustrated in FIGS. 1-3, similar numerals will be utilized to designate similar components, the suffix letter "a" will be added to the numerals of FIG. 4 to avoid confusion.

Figure 4:
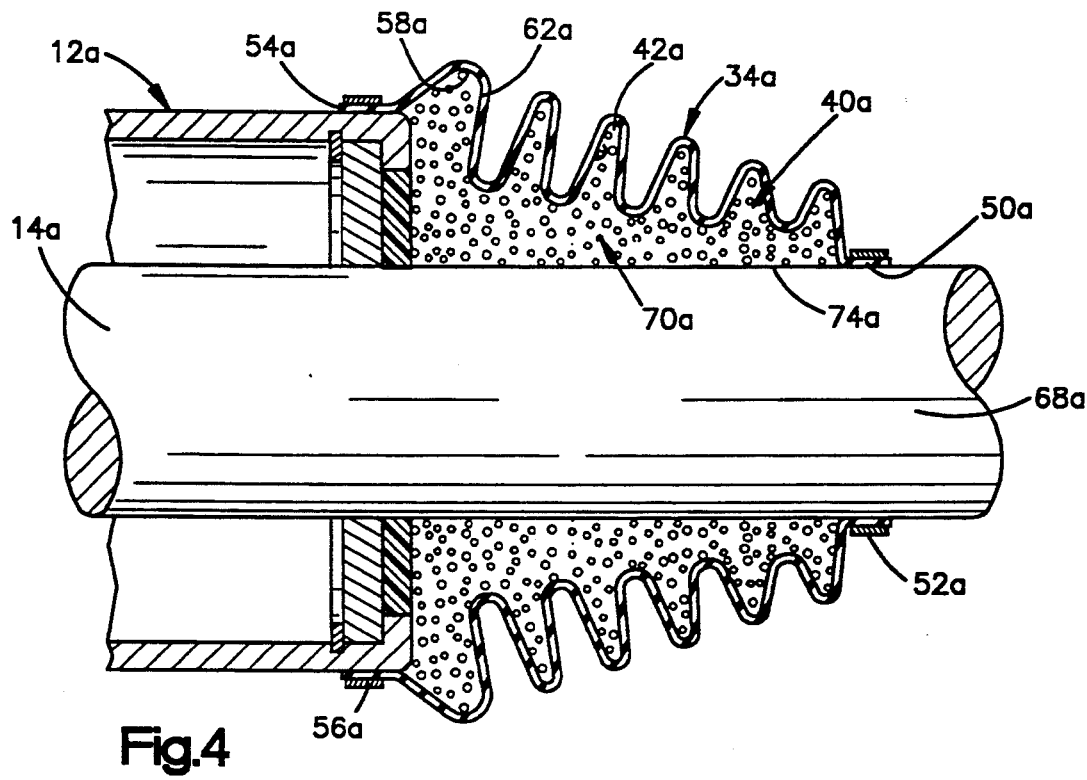
FIG. 4 is a view similar to FIG. 2, illustrating a second embodiment of the invention.

In the embodiment of the invention illustrated in FIG. 4, a deformable and compressible body 40a of foam material is disposed in a chamber 42a within a flexible bellows 34a. A left end portion 54a of the bellows 34a is connected with the housing 12a by a band 56a. Similarly, the right end portion 50a of the bellows 34a is connected with a rack 14a by a band 52a.

The deformable and compressible body 40a is formed entirely by the body 70a of liquid impermeable material. Thus, the embodiment of the invention illustrated in FIG. 4 does not include a body of liquid permeable foam material, corresponding to the body 66 of liquid permeable foam material in the embodiment of the invention illustrated in FIG. 2. The body 70a of liquid impermeable material fills the chamber 42a and extends around the rack 14a to retard conduction to the rack of any water which may leak through the bellows 34a. The body 70a of liquid impermeable material has a cylindrical inner side surface 74a which is disposed in engagement with the cylindrical outer side surface 68a of the rack 14a.

The body 70a of liquid impermeable material is a closed-cell foam. Thus, the body 70a is formed of a foam having individual cells which are completely surrounded by a thin membrane. Therefore, water or other liquid can not be conducted between cells of the foam forming the body 70a of liquid impermeable material. Although the body 70a could be formed of many different materials, the body 70a is a flexible polyurethane foam having a high degree of compressibility. Of course, other known types of closed-cell flexible foams having a high degree of compressibility could be used if desired.

The left (as viewed in FIG. 4) end portion of the body 70a of liquid impermeable material is connected with the housing 12a. The right (as viewed in FIG. 4) end of the body 70a of liquid (impermeable) material is connected with the rack 14a. Therefore, when the rack 14a moves relative to the housing 12a, the right (as viewed in FIG. 4) end portion of the body 70a of liquid impermeable material moves relative to the left end portion of the body of liquid impermeable material.

A Third Embodiment of the Invention

Figure 5:
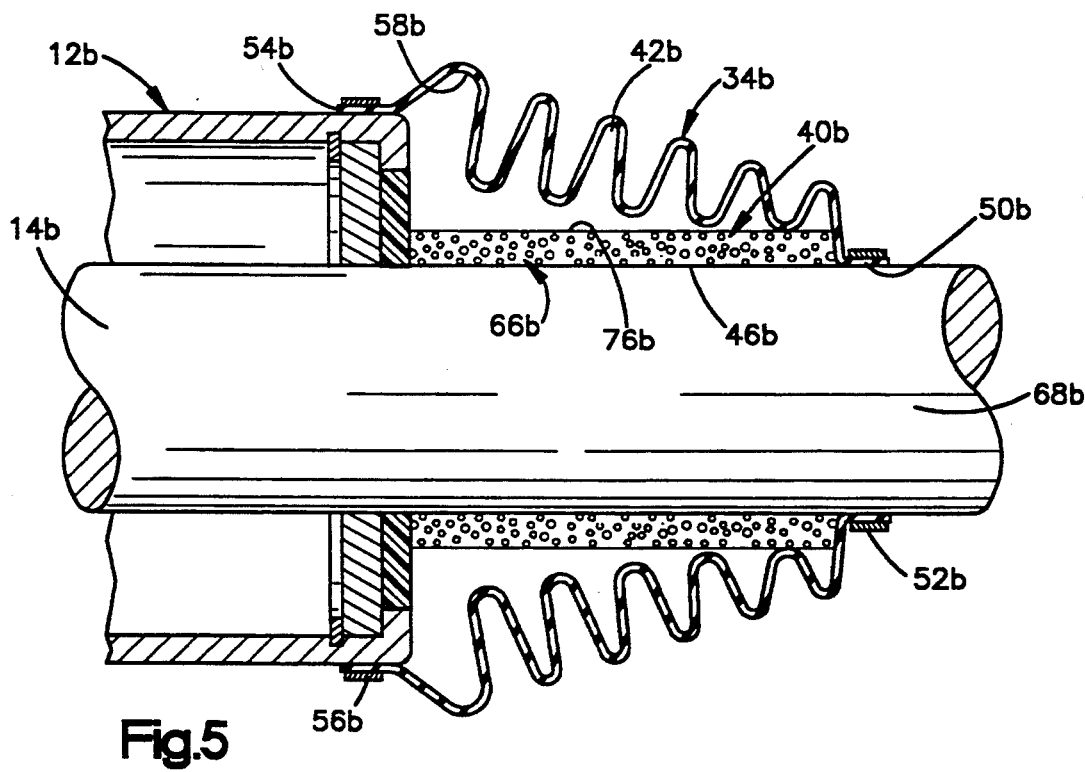
FIG. 5 is a view similar to FIG. 2, illustrating a third embodiment of the invention.

The embodiment of the invention illustrated in FIG. 5 is generally similar to the embodiments of the invention illustrated in FIGS. 1-4. Therefore, similar numerals will be utilized to designate similar components, the suffix letter "b" be added to the numerals of FIG. 5 to avoid confusion.

In the embodiment of the invention illustrated in FIG. 5, a deformable and compressible body 40b of foam material is disposed in a chamber 42b within a flexible bellows 34b. The deformable and compressible body 40b of foam material is formed entirely by a body 66b of liquid permeable foam material. Thus, the embodiment of the invention illustrated in FIG. 5 does not include a body of liquid impermeable material corresponding to the body 70 of liquid impermeable material in the embodiment of the invention illustrated in FIG. 2. The body 66b of liquid permeable foam material has a cylindrical inner side surface 46b which is disposed in engagement with a cylindrical outer side surface 68b of the rack 14b.

The body 66b of liquid permeable foam material is an open-cell foam in which individual cells are interconnected or intercommunicating similar to a natural sponge. Thus, liquid can be conducted between the cells of the body 66b of liquid permeable foam material. The body 66b of liquid permeable foam material is a flexible open-cell polyurethane foam having a high degree of compressibility. Of course, the body 66b of liquid permeable material could be formed by other open-cell foams which are flexible and have a high degree of compressibility.

The body 66b of liquid permeable foam material contains a lubricating liquid (oil). Thus, the open-cells of the body 66b of liquid permeable foam material contain lubricating liquid. The lubricating liquid is applied to the cylindrical outer side surface 68b of the rack 14b by the body 66b of liquid permeable foam material. If desired, the lubricating liquid may contain a known rust inhibitor.

In the embodiment of the invention illustrated in FIG. 5, the body 66b of liquid permeable foam material has a cylindrical outer side surface 76b. The cylindrical outer side surface 76b is formed as a skin which is liquid impermeable. Thus, lubricating liquid can only flow through the radially inner side surface 46b of the body 66b of liquid permeable foam material and can not flow through the outer side surface 76b of the body 66b of liquid permeable foam material.

In the embodiment of the invention illustrated in FIG. 5, the body 66b of liquid permeable foam material only partially fills the chamber 42b in the bellows 34b. However, if desired, the chamber 42b in the bellows 34b could be completely filled by the body 66b of liquid permeable foam material.

The left (as viewed in FIG. 5) end portion of the body 66b of liquid permeable foam material is connected with the housing 12b. The right (as viewed in FIG. 5) end of the body 66b of liquid permeable foam material is connected with the rack 14b. Therefore, when the rack 14b moves relative to the housing 12b, the right (as viewed in FIG. 5) end portion of the body 66b of liquid permeable foam material moves relative to the left end portion of the body 66b of liquid permeable foam material.

From the above description of the invention, those skilled in the art will perceive improvements, changes and modifications. Such improvements, changes and modifications, within the skill of the art, are intended to be covered by the appended claims.

Having described the invention, the following is claimed:

1. A rack and pinion steering gear assembly for use in turning a steerable vehicle wheel, said rack and pinion steering gear assembly comprising,
    a housing;
    rack means at least partially enclosed by and movable relative to said housing, said rack means being movable relative to said housing to turn the steerable vehicle wheel;
    a bellows connected with one end portion of said housing and one end portion of said rack means, a portion of said rack means being enclosed by said bellows; and
    a body of liquid permeable material disposed within said bellows and enclosing a portion of said rack means, said body of liquid permeable material containing lubricating liquid which is applied to said rack means.

2. A rack and pinion steering gear assembly as set forth in claim 1 wherein said rack means is movable relative to said housing between a first position in which said rack means extends a first distance outward from said housing and a second position in which said rack means extends a second distance outward from said housing, said second distance being greater than said first distance, said body of liquid permeable material extending further along said rack means when said rack means is in the second position than when said rack means is in the first position.

3. A rack and pinion steering gear assembly as set forth in claim 1 wherein said body of liquid permeable material is an open-cell foam, said open-cell foam having cells which are at least partially filled with lubricating liquid.

4. A rack and pinion steering gear assembly as set forth in claim 1 wherein said body of liquid permeable material has a generally tubular configuration and has an axial extent which varies during movement of said rack means relative to said housing, said rack means extending through a central passage formed in said body of liquid permeable material.

5. A rack and pinion steering gear assembly as set forth in claim 1 wherein said body of liquid permeable material has a first end portion connected with said one end portion of said housing and a second end portion connected with said one end portion of said rack means, said second end portion of said body of liquid permeable material being movable relative to said first end portion of said body of liquid permeable material during movement of said rack means relative to said housing.

6. A rack and pinion steering gear assembly as set forth in claim 5 wherein said body of liquid permeable material is compressed and lubricating liquid is forced out of said body of liquid permeable material as said second end portion of said body of liquid permeable material is moved toward said first end portion of said body of liquid permeable material by movement of said one end portion of said rack means toward said one end portion of said housing.

7. A rack and pinion steering gear assembly as set forth in claim 1 further including a body of liquid impermeable material disposed between said bellows and said body of liquid permeable material to at least partially block the conduction of lubricating liquid from said body of liquid permeable material toward said bellows and to at least partially block conduction toward said rack means of any water which may leak through said bellows.

8. A rack and pinion steering gear assembly for use in turning a steerable vehicle wheel, said rack and pinion steering gear assembly comprising:
    a housing;
    rack means at least partially enclosed by and movable relative to said housing, said rack means being movable relative to said housing to turn the steerable vehicle wheel;
    a bellows connected with one end portion of said housing and one end portion of said rack means, a portion of said rack means being enclosed by said bellows; and
    a body of liquid impermeable material disposed within said bellows and enclosing a portion of said rack means to retard conduction to said rack means of any water which may leak through said bellows.

9. A rack and pinion steering gear assembly as set forth in claim 8 wherein said rack means is movable relative to said housing between a first position in which said rack means extends a first distance outward from said housing and a second position in which said rack means extends a second distance outward from said housing, said second distance being greater than said first distance, said body of liquid impermeable material extending further along said rack means when said rack means is in the second position than when said rack means is in the first position.

10. A rack and pinion steering gear assembly as set forth in claim 8 wherein said body of liquid impermeable material is a closed-cell foam.

11. A rack and pinion steering gear assembly as set forth in claim 10 further including a body of open-cell foam disposed within said bellows between said rack means and said body of liquid impermeable material, said body of open-cell foam containing lubricating liquid which is applied to said rack means by said body of open-cell foam.

12. A rack and pinion steering gear as set forth in claim 8 wherein said body of liquid impermeable material has a generally tubular configuration and has an axial extent which varies during movement of said rack means relative to said housing, said rack means extending through a central passage formed in said body of liquid impermeable material.

13. A rack and pinion steering gear assembly as set forth in claim 8 wherein said body of liquid impermeable material has a first end portion connected with said one end portion of said housing and a second end portion connected with said one end portion of said rack means, said second end portion of said body of liquid impermeable material being movable relative to said first end portion of said body of liquid impermeable material during movement of said rack means relative to said housing.

14. A rack and pinion steering gear assembly as set forth in claim 13 further including a body of liquid permeable material disposed between said body of liquid impermeable material and said rack means, said body of liquid permeable material having a first end portion connected with said one end portion of said housing and a second end portion connected with said one end portion of said rack means, said second end portion of said body of liquid permeable material being movable relative to said first end portion of said body of liquid permeable material during movement of said rack means relative to said housing.

15. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and said deformable and compressible body of material being at least partially formed of a closed-cell foam which is water impermeable.

16. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and said deformable and compressible body of material being at least partially formed of open-cell foam which contains a lubricating liquid, said surface means being formed by said open-cell foam which contains a lubricating liquid and being disposed in engagement with a portion of said member.

17. An apparatus as set forth in claim 16 wherein said deformable and compressible body of material is at least partially formed of a closed-cell foam which is water impermeable and extends around said open-cell foam.

18. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and at least a portion of said deformable and compressible body of material containing a lubricating liquid, said surface means being disposed on said portion of said deformable and compressible body of material which contains the lubricating liquid.

19. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and at least a portion of said deformable and compressible body of material is water impermeable and extends completely around a portion of said member.

20. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and a first portion of said deformable and compressible body of material containing a lubricating liquid and being disposed adjacent to and extending around said member and a second portion of said deformable and compressible body of material being water impermeable and extending around said first portion of said deformable and compressible body of material.

21. An apparatus comprising:
a housing;
a member supported by and movable relative to said housing;
a bellows connected with said member and said housing, said bellows at least partially defining a chamber through which said member extends; and
a deformable and compressible body of material located in said chamber and extending around said member, said deformable and compressible body of material having surface means forming a passage through which said member extends and said surface means defining a passage through which said member extends being liquid permeable, said deformable and compressible body of material containing a lubricating liquid which is conducted through said surface means to said member.

* * * * *